100
United States Patent [19]

Wood

[11] 3,901,820
[45] Aug. 26, 1975

[54] PRESSURE MODULATED GAS MEASURING METHOD AND APPARATUS

[75] Inventor: Rex Chester Wood, New Brighton, Minn.

[73] Assignee: Modern Controls, Inc., Minneapolis, Minn.

[22] Filed: Apr. 12, 1974

[21] Appl. No.: 460,445

[52] U.S. Cl. ............................................. 250/343
[51] Int. Cl.² ....................................... G01N 21/24
[58] Field of Search .......... 250/343, 344, 345, 373, 250/576

[56] References Cited
UNITED STATES PATENTS

| | | | |
|---|---|---|---|
| 2,806,957 | 9/1957 | McDonald | 250/343 X |
| 2,951,938 | 9/1960 | Martin | 250/343 |
| 3,005,097 | 10/1961 | Hummel | 250/343 X |
| 3,180,984 | 4/1965 | Fertig et al. | 250/343 X |

*Primary Examiner*—James W. Lawrence
*Assistant Examiner*—T. N. Grigsby
*Attorney, Agent, or Firm*—Stuart R. Peterson

[57] ABSTRACT

The presence or concentration of a constituent in a gas is determined by cyclically compressing the gas to pressure modulate a beam of infrared energy that is directed through the gas as it is being repeatedly compressed. The resulting pressure modulated beam is passed through a narrow band interference filter onto a photocell which provides a fluctuating signal when the absorption characteristics of the gaseous constituent are within the filter's selected narrow bandwidth. The fluctuating signal is amplified, rectified and then delivered to a direct current ammeter. Since the fluctuating signal is produced only when the gaseous constituent is present having the specific wavelength for which the filter has been selected, any ammeter reading indicates the presence of such a constituent; on the other hand, the amount of ammeter reading is indicative of the quantity of such gaseous constituent in the mixture.

3 Claims, 2 Drawing Figures

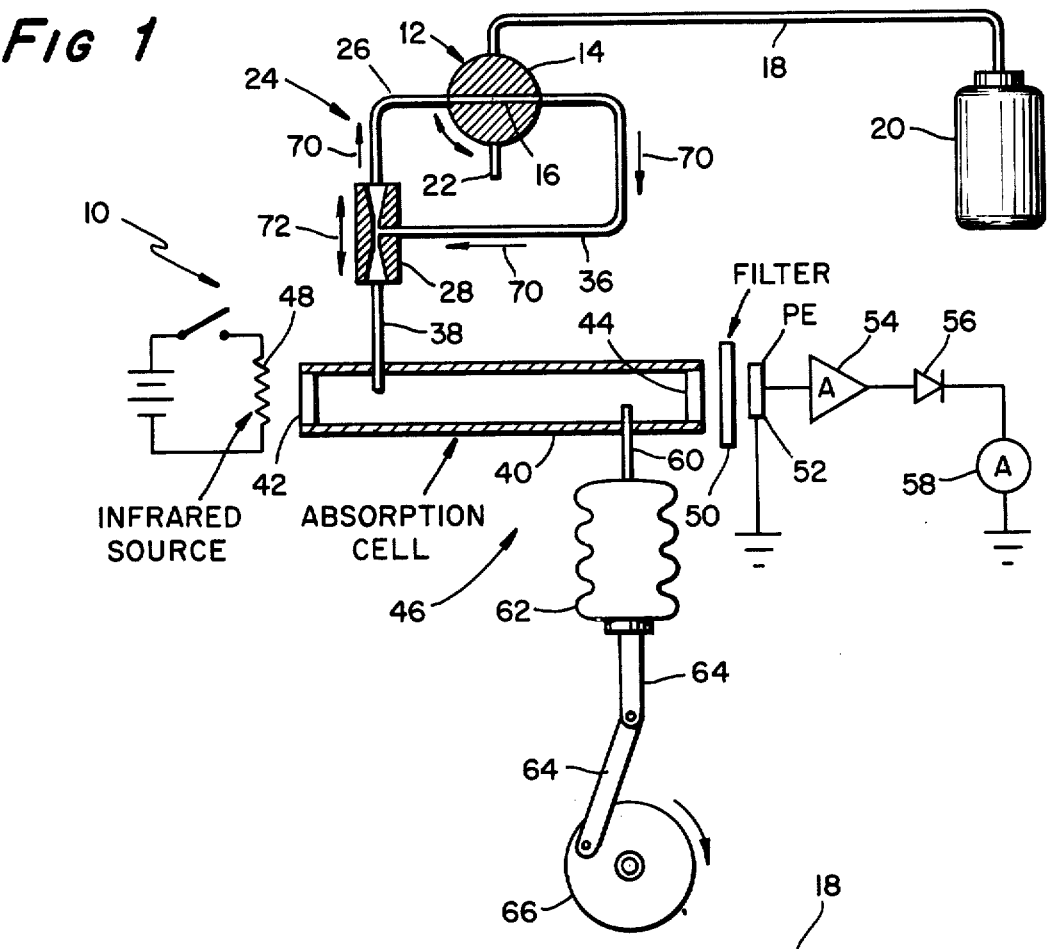
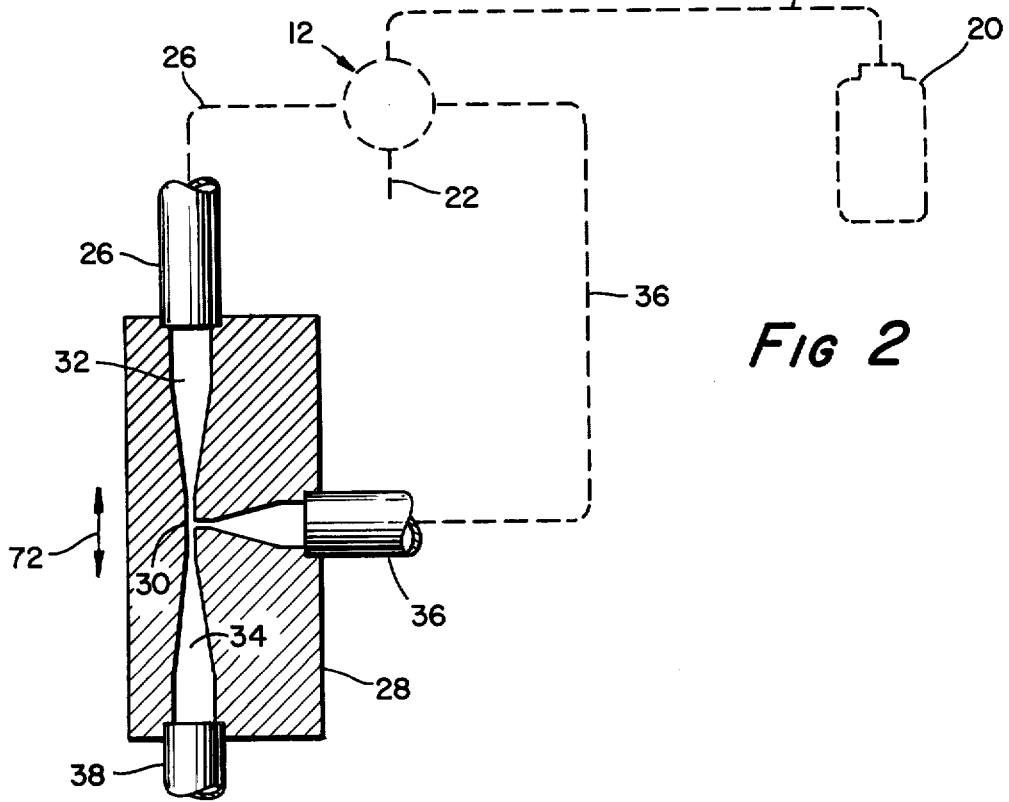

PRESSURE MODULATED GAS MEASURING METHOD AND APPARATUS

BACKGROUND OF THE INVENTION

1. Field of the Invention

This invention relates generally to infrared analyzers, and pertains more particularly to a method and apparatus for pressure modulating an infrared beam to provide a fluctuating signal that is indicative of the presence and amount of a constituent contained in a gaseous mixture.

2. Description of Prior Art

The prior art infrared analyzers or spectrometers with which I am familiar are of the dual beam or dual wavelength type. These instruments operate on a time shared basis making use of reference and measuring filter outputs which must be continuously compared with each other in order to produce meaningful results. More specifically, such prior art analyzers use mechanical moving parts, such as rotating mirrors and shutters. Additionally, the dual beam or dual wavelength feature introduces a drift due to temperature effects, contamination and optical misalignment.

SUMMARY OF THE INVENTION

Accordingly, a general object of the present invention is to obviate the shortcomings of the prior art analyzers. In this regard, an aim of the invention is to utilize a single beam which is pressure modulated so that the fluctuating photoelectrically derived signal is indicative of the presence and magnitude of the gaseous constituent being investigated.

A more specific object of the invention is to provide a method and apparatus for not only detecting the presence of small traces of an unknown gaseous constituent capable of attenuating infrared energy, but also providing an accurate means of measuring the amount of such constituent contained in a mixture that may contain other constituents of little or no interest, doing so by repeatedly or cyclically compressing the mixture while directing a beam of infrared energy therethrough as it is being compressed and also through an interference filter which attenuates all energy other than that having the particular wavelength which permits identification of the unknown gaseous constituent.

A further object is to provide an output signal only when the particular gaseous constituent is present. When practicing the teachings of my invention, if there is no such constituent present, then there is a zero signal output. On the other hand, if the gaseous constituent is present, then, and only then, there is an output signal which can be used to trigger an alarm signifying the presence of such a constituent, or, if desired, the signal can be measured and in this way an accurate indication of the constituent concentration can be determined.

Yet another object of the invention is to avoid the use in the optical system, of any mechanical moving parts, such as the rotating mirrors and shutters heretofore used, thereby minimizing the chances of inaccurate determinations, and at the same time providing apparatus that requires little or no maintenance.

Still another object is to eliminate the zero drift that has previously been encountered with dual beam or dual wavelength infrared analyzers or spectrometers, such drift being due to temperature effects, contamination or some form of optical misalignment, which are not present when using my invention.

Briefly, my invention involves the repeated compressing of a gaseous mixture containing an unknown constituent, or if the constituent is known, an unknown amount thereof, which constituent has an infrared absorption property that attenuates the passage of infrared energy at a given wavelength. The repeated compressing of the gaseous mixture increases the absorption characteristics when the pressure is greater, and the absorption characteristics are decreased when the mixture is under a lesser pressure. Such action results in a pressure modulation of the infrared energy beam, so when the modulated beam is transmitted through an interference filter capable of passing infrared energy only within a relatively narrow band, which narrow band contains the attenuating wavelength of the constituent being investigated, there will be a fluctuating signal sensed by a photoelectric cell only when the absorbing constituent is present in the gaseous mixture. If a definite amount or volume of the gaseous mixture is introduced into the apparatus, then the magnitude of the fluctuating signal is representative of the quantity or concentration of the unknown constituent. Therefore, my invention is useful for both detecting the presence of an unknown gas and also measuring the amount thereof.

BRIEF DESCRIPTION OF THE DRAWING

FIG. 1 is a diagrammatic representation of apparatus constituting one form my invention may assume, and FIG. 2 is an enlarged view of a portion of the Venturi circulator embodied in the apparatus of FIG. 1.

DESCRIPTION OF THE PREFERRED EMBODIMENT

It will be appreciated that a number of gases (and vapors) attenuate infrared radiation at certain wavelengths. For instance, butane attenuates radiation having a wavelength of 3.4 $\mu m$. Carbon dioxide has an attenuating wavelength of 4.3 $\mu m$. Should the gas undergoing examination be flue gas, sulphur dioxide and nitrogen dioxide then usually being present, such gaseous constituents would have still different attenuating wavelengths, thereby permitting their identification simply by reason of their attenuating capabilities. In this way, when the appropriate interference filter is employed which will absorb infrared energy other than that associated with the particular wavelength that is to be checked or detected, more specifically the gaseous constituent possessing this wavelength, then that energy which passes through the filter is indicative of the presence of the unknown constituent and the magnitude of such signal is representative of the amount of such constituent or its concentration.

The apparatus selected for exemplifying my invention has been given the reference numeral 10. Included in the apparatus 10 is a metering valve 12 which comprises a rotatable body 14 through which extends a passage or open-ended cavity 16 of fixed dimensions so that a specific volume of gas can be confined therein. When vertically aligned with a tube or line 18, gas can flow from a supply tank 20 through the line 18, the passage 16 of the metering valve 12, and then outwardly through an exhaust tube or line 22 to atmosphere. However, a specific volume or quantity of the gas from the tank 20 will remain in the passage or cavity 16 when the valve body 14 is rotated to bring the passage or cavity into the horizontal position depicted in FIG. 1, as will presently be made manifest.

Assuming for the sake of discussion that the gaseous mixture in the tank 20 contains carbon dioxide ($CO_2$) and that it is uniformly mixed within the mixture, a certain amount of the unknown constituent will be present in the sample or specimen confined in the passage 16 of the valve 12 when the passage is rotated from a vertical position to its horizontal position. If it is only desired to detect the presence of carbon dioxide, then no metering device, such as the valve 12, need by employed. It is believed that this will become clearer as the description progresses.

At this time, attention is directed to what is termed a Venturi circulator denoted generally by the reference numeral 24. More specifically, the circulator 24 includes a tube or line 26 extending downwardly from the metering valve 12 to a Venturi device 28 (best seen in FIG. 2) in the form of a pipe having a constriction or throat at 30 with gradually enlarging conical passages 32, 34 extending upwardly and downwardly from the centrally disposed throat 30. As is generally well known, as far as Venturi nozzles are concerned, the pressure, owing to the faster gas flow at the throat 30, provides a region of reduced pressure. Connected between the metering valve 12 and the throat 30 is a tube or line 36. Extending downwardly from the lower enlarged end 34 of the Venturi device 28 is another tube or line 38, this tube communicating with the interior of an elongated absorption cell 40 having infrared transmitting windows 42, 44 at opposite ends thereof.

The cell 40 is an important part of an infrared gas analyzer denoted generally by the reference numeral 46 which also includes a source 48 of infrared energy at one end thereof. The source 48 provides a beam of radiant energy that passes completely through the elongated cell 40 and then through an interference filter 50 which is selected so as to transmit a narrow band of radiation centered near 4.3 $\mu m$, this being the wavelength at which the constituent gas, carbon dioxide, has its greatest attenuation. Inasmuch as the method herein described can be employed to sense any gas having an absorption-spectra in the near or actual infrared, the particular filter 50 will be selected in accordance with the absorption properties of the gas to be detected. Stated somewhat differently, the absorption characteristic is what determines the selection of a particular filter 50 inasmuch as the wavelength of the energy transmitted through the filter 50 will be indicative of the unknown gaseous constituent. In the present situation, carbon dioxide has been mentioned as being present in the gas mixture contained in the tank 20, but in actual practice it may or may not be in the mixture being investigated. The purpose of the test or investigation is to find out whether it is present or is not.

The analyzer 46 also includes a photoelectric cell 52 onto which the radiant beam impinges after passing through the filter 50. Although perhaps not readily appreciated at this stage, the output from the photocell 52 constitutes a fluctuating or alternating current signal and is impressed upon the input of an alternating current amplifier 54. The AC amplified output from the amplifier 54 is delivered to an output rectifier 56 which furnishes a variable direct current signal that is delivered to a DC ammeter 58.

At this time attention is directed to the use of a tube or line 60 leading downwardly from the cell 40 to a flexible metal bellows 62. Articulated linkage 64 actuated by a motor-driven crank wheel or disc 66 causes the bellows 62 to be repeatedly collapsed and expanded. As will become clearer hereinafter, such repeated compression of the bellows 62 causes the infrared beam to be modulated by reason of the resulting pulsating pressure when, in this instance, carbon dioxide is present.

OPERATION

With the foregoing information in mind, the manner in which my apparatus functions should be readily apparent; however, a detailed operational sequence will be of help, it is believed, in fully appreciating the various benefits to be derived therefrom. It will be recalled that carbon dioxide has been selected as the particular gaseous constituent to be looked for. If the investigation is only concerned with the presence of carbon dioxide within the mixture contained in the tank 20, then the valve 12 can be omitted. Also, it will be recognized that the tank 20 is only illustrative, and that the source of the gaseous mixture might come directly from the source. For instance, if a flue gas is to be examined as far as certain constituents thereof are concerned, then the mixture would be delivered directly to the Venturi circulator 24 at the location where the metering valve 12 is located. If the quantity or amount of any given constituent is to be ascertained, then some metering device, such as the valve 12, will be used in order to introduce a predetermined amount of the gaseous mixture into the circulator 24.

In using the illustrated apparatus 10, however, the passage 16 of the valve 12 is first vertically aligned with the tubes 18, 22 so that gas flows from the tank 20 through the passage 16 to atmosphere. To capture a sample or specimen, the body 14 is then rotated so that the passage 10 is horizontally aligned with the tubes 26 and 36, thus permitting the sample to be delivered to the Venturi circulator 24.

The Venturi circulator 24, more particularly the device 28 thereof, functions to circulate the gas delivered thereto from the valve 12 in a closed loop represented by the sequence of arrows labeled 70. This is achieved by the motor-actuated bellows 62 being repeatedly compressed or collapsed to cause gaseous flow in the direction of the double-headed arrow 72. owing to the region of reduced pressure at the throat 30, the low pressure at this site acts to draw the gas sample into the Venturi device 28 through the tube 36 from the valve 12, more specifically from the passage or cavity 16 that is now oriented horizontally as indicated in FIG. 1, having been rotated through 90° from the vertical position in which it receives gas from the tank 20. It will be recognized that the reduced pressure exists whether the gas is being forced upwardly or downwardly as indicated by the double-headed arrow 72. Because of the continuous agitation provided by the pulsations derived from the bellows 62 that is being repeatedly collapsed and expanded, the sample of gaseous mixture containing the carbon dioxide constituent is drawn into the absorption cell 40 of the analyzer 46.

The cyclic compressing of the bellows 62 will correspondingly compress whatever carbon dioxide is present in the gaseous mixture. When the carbon dioxide is compressed, it becomes less transparent, that is, absorbs more radiant energy than when not compressed, and when the pressure is relaxed or decreased, then more energy passes with less energy being absorbed in the cell 40 of the analyzer 46. Use is made of this pressure effect to produce a very detectable modulation of the infrared beam passing through the cell 40. It will be understood that the motor-driven bellows 62 produces pressure pulsations sufficiently pronounced to enable detection by the photocell 52. Since the amplifier 54 is an AC one, only the fluctuating signal will be amplified.

If the motor-driven wheel or disc 66 is rotated at 1800 rpm, the pulsation frequency is 30 hz. Not only are the pressure pulsations used to modulate the beam passing through the cell 40, but the Venturi action circulates gas from the metering valve 12 around the closed loop represented by the arrows 70.

If no carbon dioxide is contained within the gas mixture supplied from the tank 20, then there will be no such constituent in the absorption cell 40. Consequently, under these conditions, the pressure pulsations in the absorption cell 40 will not produce any modulation of the radiant energy through the cell 40 and the photocell 52 will experience only a reception of a constant level of radiation; therefore, there will be no alternating current signal delivered from the photocell 52 to the alternating current amplifier 54. Since there is no output signal from the amplifier 54, because there is no fluctuating input thereto, the rectifier 56 will not forward a direct current signal to the DC ammeter 58, because it receives nothing from the amplifier 54, and the ammeter 58 will read "zero."

On the other hand, assuming that there is some carbon dioxide in the gaseous mixture supplied from the tank 20 via the metering valve 12, then there will be after a short interval of time a representative amount of the gaseous mixture within the absorption cell 40. Since the mixture, under these conditions, includes the carbon dioxide constituent, the carbon dioxide will absorb a fraction of the radiant energy supplied from the source 48. This will cause a reduced amount of energy to impinge on the photocell 52. Furthermore, this absorption will vary as the pulsating pressure varies, so that the energy incident upon the photocell 52 will for all intents and purposes flicker. As can be readily understood, the resulting AC signal will be the same frequency as the pressure pulsations and its amplitude will be a function of the concentration of carbon dioxide gas in the cell 40 and therefore an indication of the amount contained in the overall gaseous mixture.

It should be appreciated that without any carbon dioxide in the absorption cell 40, then there is no modulated signal picked up by the photocell 52 and hence there is no signal to be amplified and rectified. This is very important as far as detection of an unknown gas is concerned, for there is either a signal present or a signal not present. Even though the flickering signal from the photocell 52 is quite small, it can be amplified adequately and supplied to some other instrument other than the ammeter 58. For instance, it can be used to trigger an alarm which would signify the presence of a noxious gas for which an alert should be given to personnel that might be present in a monitored area. Of course, the measuring of the magnitude of the alternating current signal from the photocell 52, such as through the agency of the ammeter 58, will afford an accurate indication of the amount of whatever gas is being looked for.

It will be recognized that the components comprising my apparatus 10 are only schematically portrayed and are not to scale. For instance, the passage or cavity 16 would be sufficiently large so as to introduce a gaseous sample ample enough to occupy the cell 40 so that the detection can be effected. Also, the apparatus 10 should be purged of any residual gaseous mixture remaining from a previous test; the means for removing such gas is not illustrated, as it forms no part of my invention.

I claim:

1. Apparatus for detecting the presence of a gas comprising an absorption cell for containing at least a portion of said gas, means for pressure modulating the gas contained in said cell, a source of infrared energy at one end of said cell, a photocell at the other end of said absorption cell for providing a fluctuating signal in accordance with the degree said infrared energy is modulated by said pressure modulating means when said gas is capable of absorbing some of said infrared energy, an interference filter between said absorption cell and said photocell for transmitting infrared energy in a narrow band containing the wavelength at which said gas is capable of absorbing infrared energy, a metering device, and a Venturi device connected between said metering device and said absorption cell.

2. The apparatus of claim 1 in which said Venturi device includes first and second tapered passages and a constricted throat therebetween, said first passage and said throat being connected to said metering device and said second passage being connected to said absorption cell.

3. The apparatus of claim 2 in which said pressure modulating means includes a bellows.

* * * * *